(12) United States Patent
Wang et al.

(10) Patent No.: US 12,340,409 B2
(45) Date of Patent: Jun. 24, 2025

(54) METHOD AND APPARATUS FOR SHARING INFORMATION

(71) Applicants: Beijing Wodong Tianjun Information Technology Co., Ltd., Beijing (CN); Beijing Jingdong Century Trading Co., Ltd., Beijing (CN)

(72) Inventors: Yingshuai Wang, Beijing (CN); Xiaoxia Li, Beijing (CN); Shiyu Miao, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 46 days.

(21) Appl. No.: 17/766,942

(22) PCT Filed: Aug. 21, 2020

(86) PCT No.: PCT/CN2020/110407
§ 371 (c)(1),
(2) Date: Apr. 6, 2022

(87) PCT Pub. No.: WO2021/093399
PCT Pub. Date: May 20, 2021

(65) Prior Publication Data
US 2024/0078585 A1    Mar. 7, 2024

(30) Foreign Application Priority Data
Nov. 15, 2019    (CN) .......................... 201911118409.2

(51) Int. Cl.
*G06Q 30/00*    (2023.01)
*G06Q 30/0207*    (2023.01)
*G06Q 30/0601*    (2023.01)

(52) U.S. Cl.
CPC ..... *G06Q 30/0631* (2013.01); *G06Q 30/0213* (2013.01); *G06Q 30/0222* (2013.01)

(58) Field of Classification Search
CPC .......... G06Q 30/0631; G06Q 30/0213; G06Q 30/0222; H04L 67/12; H04L 67/53
See application file for complete search history.

(56) References Cited

U.S. PATENT DOCUMENTS 8,438,052 B1 * 5/2013 Chanda .............. G06Q 30/0207
                                                   705/7.11
10,127,599 B2 * 11/2018 Maenpaa ........... G06Q 30/0633
(Continued)

FOREIGN PATENT DOCUMENTS

CN    104636963 A    5/2015
CN    104835058 A    8/2015
(Continued)

OTHER PUBLICATIONS

Warner, Christine. How Social Shopping Experiences Elevate Product Marketing. Nov. 19, 2018. Published via Skyword. Accessed via https://www.skyword.com/contentstandard/how-social-shopping-experiences-elevate-product-marketing/ (Year: 2018).*

(Continued)

*Primary Examiner* — Christopher B Seibert
(74) *Attorney, Agent, or Firm* — Blank Rome LLP

(57) ABSTRACT

Disclosed are a method and apparatus for sharing information. A particular embodiment of the method comprises: in response to detecting that a user selects article information from a preset candidate item information set, adding the selected article information to a target article information set; detecting whether the user executes a sharing operation with regard to the target article information set; and in response to detecting that the user has executed the sharing operation with regard to the target article information set, sending the target article information set to an object indi- (Continued)

cated by the sharing operation. According to the embodiment, the flexibility of information sharing is improved.

18 Claims, 6 Drawing Sheets

(56) References Cited

U.S. PATENT DOCUMENTS

| | | | | |
|---|---|---|---|---|
| 2002/0038255 | A1* | 3/2002 | Tarvydas | G06Q 30/0625 705/26.43 |
| 2006/0059099 | A1* | 3/2006 | Ronning | G06Q 20/1235 705/59 |
| 2010/0042515 | A1* | 2/2010 | Crespo | G06Q 30/0605 715/764 |
| 2010/0185514 | A1* | 7/2010 | Glazer | G06Q 30/0253 715/848 |
| 2011/0184834 | A1* | 7/2011 | Perrochon | G06Q 30/0633 705/26.8 |
| 2012/0182384 | A1* | 7/2012 | Anderson | H04L 65/1083 348/14.09 |
| 2012/0185355 | A1* | 7/2012 | Kilroy | G06Q 30/0633 705/26.8 |
| 2012/0226573 | A1* | 9/2012 | Zakas | G06Q 30/0601 705/26.7 |
| 2012/0236144 | A1* | 9/2012 | Rao | H04N 1/60 705/26.7 |
| 2012/0316941 | A1* | 12/2012 | Moshfeghi | G06Q 30/02 705/14.16 |
| 2012/0323682 | A1* | 12/2012 | Shanbhag | G06Q 30/0641 705/14.66 |
| 2013/0211953 | A1* | 8/2013 | Abraham | G06Q 30/06 705/26.8 |
| 2013/0262616 | A1* | 10/2013 | Kim | H04L 67/1097 709/214 |
| 2013/0290172 | A1* | 10/2013 | Mashinsky | G06Q 20/28 705/39 |
| 2013/0301953 | A1* | 11/2013 | Montague | G06F 3/04845 345/660 |
| 2014/0089171 | A1* | 3/2014 | Gandhi | G06Q 20/24 705/39 |
| 2014/0122203 | A1* | 5/2014 | Johnson | G06Q 30/0633 705/26.8 |
| 2014/0195370 | A1* | 7/2014 | Devasia | G06Q 30/0633 705/26.7 |
| 2014/0244441 | A1* | 8/2014 | Maenpaa | G06Q 30/0633 705/26.61 |
| 2015/0088684 | A1 | 3/2015 | Nygaard et al. | |
| 2015/0124285 | A1* | 5/2015 | Iwasaki | G06F 3/1238 358/1.15 |
| 2015/0169624 | A1* | 6/2015 | Gupta | G06F 16/951 707/610 |
| 2015/0206224 | A1* | 7/2015 | Ouimet | G06Q 30/0251 705/26.7 |
| 2016/0073034 | A1* | 3/2016 | Mukherjee | H04N 23/63 348/333.11 |
| 2016/0104303 | A1* | 4/2016 | Dorner | H04N 1/644 382/164 |
| 2016/0127199 | A1* | 5/2016 | Ding | H04L 67/02 709/226 |
| 2016/0171540 | A1* | 6/2016 | Mangipudi | G06Q 30/0255 705/14.53 |
| 2016/0171578 | A1* | 6/2016 | Bawge | H04L 51/52 705/26.41 |
| 2016/0171588 | A1* | 6/2016 | Linden | G06F 3/0482 705/26.7 |
| 2017/0270574 | A1* | 9/2017 | Hessurg | G06Q 30/0601 |
| 2018/0067906 | A1* | 3/2018 | Fujisaki | G06F 40/134 |
| 2019/0289010 | A1* | 9/2019 | Yassour | H04L 67/125 |
| 2020/0218581 | A1* | 7/2020 | Blettry | G06F 9/54 |
| 2020/0302506 | A1* | 9/2020 | Parker | G06Q 30/0631 |
| 2021/0124599 | A1 | 4/2021 | Faris et al. | |

FOREIGN PATENT DOCUMENTS

| | | |
|---|---|---|
| CN | 105630806 A | 6/2016 |
| CN | 106251205 A | 12/2016 |
| CN | 106575455 A | 4/2017 |
| CN | 106651496 A | 5/2017 |
| CN | 107818004 A | 3/2018 |
| CN | 108446410 A | 8/2018 |
| CN | 109389442 A | 2/2019 |
| CN | 109447759 A | 3/2019 |
| CN | 109829703 A | 5/2019 |
| CN | 110298725 A | 10/2019 |

OTHER PUBLICATIONS

Sabir, Said. "E-commerce solution: creating a shopping cart using open sources (APACHE/MYSQL/PHP)." (2010). (Year: 2010).*

International Search Report for PCT/CN2020/110407, dated Oct. 28, 2020, 6 pgs.

Chinese Office Action for CN 2021062802391940, dated Jul. 1, 2021, 9 pgs.

* cited by examiner

METHOD AND APPARATUS FOR SHARING INFORMATION

This application is a U.S. National Stage of International Application No. PCT/CN2020/110407, filed on Aug. 21, 2020, which claims priority from Chinese Patent Application No. 201911118409.2, filed on Nov. 15, 2019, titled "Method and Apparatus for Sharing Information", the disclosures of the which are hereby incorporated by reference in its entirety.

TECHNICAL FIELD

Embodiments of the present disclosure relate to the field of computer technology, and specifically to a method and apparatus for sharing information.

BACKGROUND

With the development of the Internet and big data, more and more consumers like to shop online. Relevant information sharing method is usually refers to that users share the purchased products or favorite stores according to the product dimension or store dimension.

SUMMARY

Embodiments of the present disclosure propose a method and apparatus for sharing information.

In a first aspect, an embodiment of the present disclosure provides a method for sharing information, comprising: in response to detecting that a user selects item information from a preset candidate item information set, adding the selected item information to a target item information set; detecting whether the user performs a sharing operation on the target item information set; and in response to detecting that the user performs the sharing operation on the target item information set, sending the target item information set to an object indicated by the sharing operation.

In some embodiments, the in response to detecting that the user selects the item information from the preset candidate item information set, adding the selected item information to the target item information set, comprises: in response to receiving screening information input by the user, using the screening information to select item information from the preset candidate item information set, and adding the selected item information to the target item information set.

In some embodiments, the sending the target item information set to the object indicated by the sharing operation comprises: sending, to the object indicated by the sharing operation, the target item information set and a payment request for requesting the object to pay for a target item indicated by the target item information set.

In some embodiments, the method further comprises: receiving a payment result information, the payment result information indicating a result of the object paying for the target item indicated by the target item information set.

In some embodiments, the sending the target item information set to the object indicated by the sharing operation comprises: sending, to the object indicated by the sharing operation, the target item information set and a comment request for requesting the object to comment on a target item indicated by the target item information set.

In some embodiments, the method further comprises: receiving a comment of the object on the target item indicated by the target item information set.

In some embodiments, the method further comprises: acquiring a user profile of the user; inputting the user profile into a pre-trained recommendation model to obtain an item information set, wherein, the obtained item information set includes item information of items of different categories; and presenting the obtained item information set.

In some embodiments, the method further comprises: in response to receiving a question targeting at the target item information set from a questioner, presenting the question; and in response to receiving a reply of the user on the question, sending the reply to a terminal of the questioner.

In some embodiments, the method further comprises: acquiring operation information of operations performed by other users on the target item information set; determining, based on the acquired operation information, an adoption rate of the target item information set by the other users; and in response to determining that the adoption rate is greater than a preset adoption rate threshold, adding a preset preferential information to an user account of the user.

In some embodiments, the candidate item information set includes item information of a purchased item and item information of an unpurchased item.

In a second aspect, an embodiment of the present disclosure provides an apparatus for sharing information, the apparatus comprises: an adding unit configured to, in response to detecting that a user selects item information from a preset candidate item information set, add the selected item information to a target item information set; a detecting unit configured to detect whether the user performs a sharing operation on the target item information set; and a sending unit configured to, in response to detecting that the user performs the sharing operation on the target item information set, send the target item information set to an object indicated by the sharing operation.

In a third aspect, an embodiment of the present disclosure provides an electronic device, which includes: one or more processors; a storage device on which one or more programs are stored; where the one or more programs when executed by the one or more processors cause the one or more processors to implement the method according to any embodiment of the first aspect.

In a fourth aspect, an embodiment of the present disclosure provides a computer-readable medium on which a computer program is stored, here, when the computer program is executed by a processor, cause the processor to implement the method according to any embodiment of the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure is further described below in detail with reference to the accompanying drawings. It may be appreciated that embodiments described herein are merely used for explaining the relevant invention, rather than limiting the invention. In addition, it should also be noted that, for ease of description, only the parts related to the relevant invention are shown in the accompanying drawings.

It should be noted that embodiments in the present disclosure and the features in the embodiments may be combined with each other on a non-conflict basis. The present disclosure will be described below in detail with reference to the accompanying drawings and in combination with the embodiments.

Figure 1:
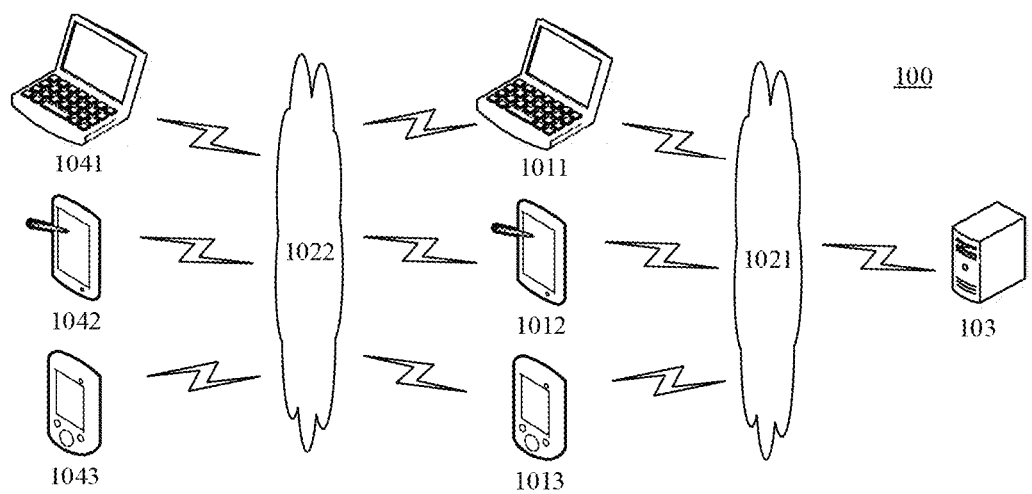
FIG. 1 is a diagram of an example system architecture in which embodiments of the present disclosure may be applied.

FIG. 1 illustrates an example system architecture 100 in which a method for sharing information or an apparatus for sharing information according to an embodiment of the present disclosure may be applied.

As shown in FIG. 1, the system architecture 100 may include sharing terminal device(s) 1011, 1012, 1013, a network 1021, a network 1022, a server 103 and receiving terminal device(s) 1041, 1042, 1043. The network 1021 is used to provide a medium of communication links between the sharing terminal device(s) 1011, 1012, 1013 and the server 103. The network 1022 is used to provide a medium of communication links between the sharing terminal device(s) 1011, 1012, 1013 and the receiving terminal device(s) 1041, 1042, 1043. The networks 1021, 1022 may include various types of connection, for example, wired or wireless communication links, or optical fiber cables, etc.

The user may use the sharing terminal device(s) 1011, 1012, 1013 to interact with the server 103 through the network 1021 to receive or send messages (for example, the server 103 receives a target item information set sent by the sharing terminal device(s) 1011, 1012, 1013) and the like. Users may also use the sharing terminal device(s) 1011, 1012, 1013 to interact with the receiving terminal device(s) 1041, 1042, 1043 through the network 1022 to receive or send messages (for example, the receiving terminal device(s) 1041, 1042, 1043 receive target item information set(s) sent by the sharing terminal device(s) 1011, 1012, 1013) and the like. Various communication client applications, for example, instant messaging software, shopping applications, payment applications, and the like, may be installed on the sharing terminal device(s) 1011, 1012, 1013 and the receiving terminal device(s) 1041, 1042, 1043.

The sharing terminal device(s) 1011, 1012, 1013 may firstly detect whether a user selects item information from a preset candidate item information set, if it is detected that the above user selects item information from the above candidate item information set, the selected item information may be added into the target item information set; after that, may detect whether the above user performs a sharing operation on the above target item information set; and finally, if it is detected that the above user performs a sharing operation on the above target item information set, the above target item information set may be sent to an object (for example, the server 103 or the receiving terminal device(s) 1041, 1042, 1043) indicated by the sharing operation.

The sharing terminal device(s) 1011, 1012, 1013 may be hardware or software. When being the hardware, the sharing terminal device(s) 1011, 1012, 1013 may be various electronic devices with display screens and support for information interaction, the electronic devices including, but not limited to, a smartphone, a tablet computer, a laptop portable computer, etc. When being the software, the sharing terminal device(s) 1011, 1012, 1013 may be installed in the above listed electronic devices. The terminal device may be implemented as a plurality of pieces of software or a plurality of software modules (e.g., software or software modules for providing a distributed service), or as a single piece of software or a single software module, which will not be specifically defined here.

The receiving terminal device(s) 1041, 1042, 1043 may be hardware or software. When being the hardware, the receiving terminal device(s) 1041, 1042, 1043 may be various electronic devices with display screens and support for information interaction, the electronic devices including, but not limited to, a smartphone, a tablet computer, a laptop portable computer, etc. When being the software, the receiving terminal device(s) 1041, 1042, 1043 may be installed in the above listed electronic devices. The terminal device may be implemented as a plurality of pieces of software or a plurality of software modules (e.g., software or software modules for providing a distributed service), or as a single piece of software or a single software module, which will not be specifically defined here.

The server 103 may be a server that provides various services. For example, it may be a background server that receives the target item information set shared by the user. It should be noted that the server 103 may be hardware or software. When being the hardware, the server 103 may be implemented as a distributed server cluster composed of multiple servers, or may be implemented as a single server. When being the software, the server 103 may be implemented as a plurality of pieces of software or a plurality of software modules (e.g., software or software modules for providing a distributed service), or as a single piece of software or a single software module, which will not be specifically defined here.

It should be noted that, the method for sharing information provided by embodiments of the present disclosure are usually executed by the sharing terminal device(s) 1011, 1012, and/or 1013.

It should also be noted that the sharing terminal device(s) 1011, 1012, 1013 may only send the above target item information set to the server 103. The network 1022 and the receiving terminal devices 1041, 1042, 1043 may be absent from the exemplary system architecture 100 at this time.

It should also be noted that the sharing terminal device(s) 1011, 1012, 1013 may only send the above target item information set to the receiving terminal device(s) 1041, 1042, 1043. The network 1021 and server 103 may be absent from the exemplary system architecture 100 at this time.

It should be appreciated that the numbers of the sharing terminal devices, the networks, the servers and the receiving terminal devices in FIG. 1 are merely illustrative. Any number of terminal devices, networks, servers and receiving terminal devices may be provided based on actual requirements.

Figure 2:
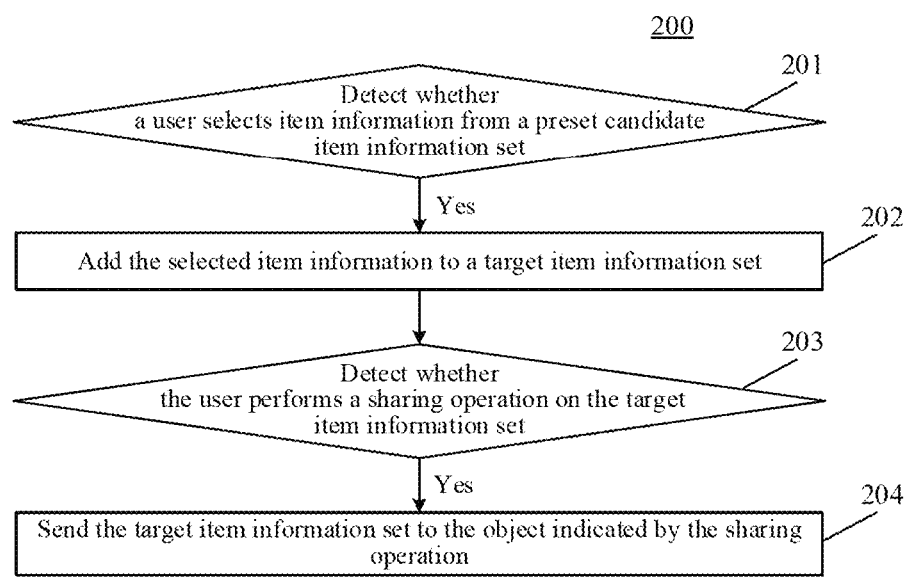
FIG. 2 is a flowchart of a method for sharing information according to an embodiment of the present disclosure.

Further referring to FIG. 2, FIG. 2 illustrates a flow 200 of the method for sharing information according to an embodiment of the present disclosure. The method for sharing information includes the following steps:

Step 201, detecting whether a user selects item information from a preset candidate item information set.

In this embodiment, the execution body (for example, a terminal device shown in FIG. 1) of the method for sharing information may detect whether a user selects item information from a preset candidate item information set. As an example, a user may select item information in the candidate item information set by clicking a selection button which is used for selecting item information. Here, the above candidate item information set may include each item information in the shopping cart of the user account logged in by the above user on the above execution body. It should be noted that each piece of candidate item information in the above candidate item information set is used to indicate one item. The above item information may include information describing an item, such as text (item title) describing the item, a picture depicting the item, and the price of the item. If that the above user selects item information from the above candidate item information set is detected, the above execution body may execute step 202.

Step 202, in response to detecting that the user selects item information from the preset candidate item information set, adding the selected item information to a target item information set.

In this embodiment, if that the user selects item information from the candidate item information set is detected in step 201, the execution body may add the selected item information to the target item information set. Here, the above target item information set may be a shopping cart list to be shared which is obtained after filtering.

Step 203, detecting whether the user performs a sharing operation on the target item information set.

In this embodiment, the above execution body may detect whether the above user performs a sharing operation on the above target item information set. Performing a sharing operation on the above target item information set may also refer to sending the above target item information set to a platform or to a user terminal of another user. As an example, if the above user clicks the "Share" button, and then selects an object to share with, such as a contact in an instant messaging software or a social platform, that the above user performs a sharing operation may be detected. If that the above user performs a sharing operation on the above target item information set is detected, the above execution body may execute step 204.

Stop 204, in response to detecting that the user performs a sharing operation on the target item information set, sending the target item information set to an object indicated by the sharing operation.

In this embodiment, if that the above user performs a sharing operation on the target item information set is detected in step 203, the execution body may send the target item information set to the object indicated by the sharing operation. If that the above user clicks the "Share" button and then selects a contact in an instant messaging software as the object to share with is detected, the above execution body may send the above target item information set to the terminal of the selected contact. If that the above user clicks the "Share" button and then selects a social platform as the object to share with is detected, the above execution body may send the above target item information set to the selected social platform.

In some optional implementations of this embodiment, the above execution body may determine whether a screening information input by the above user is received. As an example, if the above user inputs the screening information in a screening box for screening, and then clicks a Confirm button, that the above screening information input by the above user is received may be determined. After that, the above execution body may use the above screening information to select item information from the above candidate item information set, and add the selected item information to the target item information set. Particularly, the above execution body may firstly perform word segmentation on the above screening information to obtain a screening word; then, the above screening word may be matched with pre-classified item keywords (for example, brand words and category words) corresponding to respective item information in the above candidate item information set; then, item information whose matching degree is greater than a preset matching degree threshold may be added to the target item information set. Generally speaking, the above screening information may include, but is not limited to, at least one of the following: brand terms and/or category terms (for example, mobile phones, diapers).

In some optional implementations of this embodiment, the above execution body may acquire the user profile of the above user. The above user is usually the user to which the user account logged in the above execution body belongs. The user's user profile may be tag user profile abstracted from information such as user demographic information, social relationships, preference habits and consumption behavior, and the user profile may include at least one user tag. Here, the user's user profile may include static user profile. The static user profile usually includes the user's basic information, such as age, gender, city of residence, high consumption level, having children, loving sports, and so on. The user's user profile may also include dynamic user profile. The dynamic user profile is usually information related to the user's operation behavior, for example, the user's search behavior, shopping cart behavior, the objects targeted by the user's click behavior and browsing behavior, etc., duration of the user's click behavior and browsing behavior, etc., the position where the user clicks on the page, and the like.

Afterwards, the above execution body may input the above user profile into a pre-trained recommendation model to obtain an item information set. The obtained item information set may include item information of items of different categories. A category may refer to the last-level commodity classification involved in a customer's purchase decision, which can be associated with a brand, and a corresponding purchase selection can be completed on this last-level classification. For example, mineral water, air conditioners, paper towels, etc., are all categories. Here, the above obtained item information set is usually a set composed of respective item information in the user's shopping list. It should be noted that the number of obtained item information sets may be greater than or equal to 2.

Here, the above recommendation model may be used to represent the corresponding relationships between user's user profiles and item information sets. The above execution body may acquire the above recommendation model from an electronic device that stores the trained recommendation model. Here, the electronic device that stores the trained recommendation model may train the recommendation model representing the corresponding relationships between user's user profiles and item information sets.

As an example, the above recommendation model may be a corresponding relationship table that is pre-established by a technician based on statistics on a large number of user's user profiles and item information sets, and the corresponding relationship table stores the corresponding relationships between the user profiles of multiple users and the item information sets.

As another example, the above recommendation model may also be obtained by training in the following manner: first, a training sample set may be obtained, where a training sample may include a sample user profile and a sample item information set; after that, sample user profiles and sample item information sets in the training samples of the above training sample set are respectively used as inputs and expected outputs of a preset initial model, and the initial model is trained by a machine learning method to obtain the recommendation model. Here, the above initial model may include an XdeepFM model (eXtremely Deep Factorization Machine model).

Then, the above execution body may present the obtained item information set. Because the obtained item information set may be a set composed of item information in the shopping cart of a similar user similar to the above user, or a set composed of item information similar to the item information in the above user's shopping cart, the user may shop with reference to the presented item information set.

In some optional implementations of this embodiment, the above execution body may determine whether a questioner's question targeting at the above target item information set is received. After the above user shares the above target item information set on the social platform or to the contact in an instant messaging software, if another user (a user who views the above target item information set on the above social platform or on the above instant messaging software) has a question about the above target item information set and need to consult the above user, this another user may ask a question about the above target item information set; then, the question may be sent to the terminal where the user account of the above user is located. If the questioner's question targeting at the above target item information set is received, the execution body may present the above question. If the above user views the above question on the above execution body, the above user may reply to the above question. The above execution body may determine whether a reply of the above user to the above question is received. As an example, if the above user clicks a reply button for replying to the above question, and then inputs his/her reply into the reply box and clicks the "Confirm" button or the "Send" button, then that the above user's reply to the above question is received is determined. If the reply from the above user to the above question is received, the above execution body may send the above reply to the terminal of the above questioner.

In some optional implementations of this embodiment, the above execution body may acquire operation information of operations performed by other users on the above target item information set. The operations performed by other users on the above target item information set may include, but are not limited to, at least one of the following: operation of clicking, operation of browsing, operation of adding item information to the shopping cart, operation of favoriting item information, and operation of purchasing. The operation information may include the operating time of the operation performed by the user. The above execution body may determine the adoption rate of that the above target item information set is adopted by other users based on the above operation information. Here, the above execution body may store the corresponding relationships between the operation identifiers and the weights corresponding to the operations. The execution body may search for weights corresponding to the operation identifiers of the operations performed by other users on the above target item information set, and determine the sum of the weights as the adoption rate of that the target item information set is adopted by other users. It should be noted that the sum of the weights corresponding to the operation identifiers of the respective operations is usually 1. As an example, other users have performed on the above target item information set the operation of clicking, the operation of favoriting, and the operation of purchasing. The weight corresponding to the operation of clicking is 0.1, the weight corresponding to the operation of favoriting is 0.2, and the weight corresponding to the operation of purchasing is 0.3. Thus, the sum thereof 0.6 is determined as the adoption rate of that the above target item information set is adopted by other users. Then, the above execution body may determine whether the adoption rate is greater than a preset adoption rate threshold, and if it is determined that the above adoption rate is greater than the preset adoption rate threshold, the execution body may add preset preferential information to the user account of the above user. The above preferential information may be an information of discount for purchase up to a preset value, for example, an information of 5 yuan reduction for purchase up to 38 yuan; the preferential information may also be a discount information, for example, an information of 20% off for clothing items; the preferential information may also be a gift information, for example, an information of giving a specified item for purchase up to 88 yuan. It should be noted that, the above execution body may store the corresponding relationships between adoption rates and preferential information. The above user may view the available preferential information in his/her user account.

In some optional implementations of this embodiment, the above candidate item information set may include item information of purchased items and item information of unpurchased items. That is, the above user's shopping cart list may include both item information of items that the user has ordered, and item information of items that the user has not ordered. Here, the item information of the purchased item and the item information of the unpurchased item may be annotated with different identifiers, so as to distinguish the item information of the purchased items from the item information of the unpurchased items. As an example, a purchased identifier, such as a "purchased" character or a "√" icon, may be added around (for example, to the left side) of the item information of the purchased items, here, an unpurchased identifier, such as an "unpurchased" character or a "x" icon, may be added to the left side of the item information of the unpurchased items. As another example, if the item information includes an image depicting the item, a grayscale image of the image depicting the purchased item may be determined, and the grayscale image is used instead of the original image depicting the item for presentation. Then, the image depicting the purchased item is a grayscale image, while the image depicting the unpurchased item is a color image. The candidate item information set, which includes the item information of the purchased items and the item information of the unpurchased items, can facilitate the user to view and compare the item information.

Figure 3:
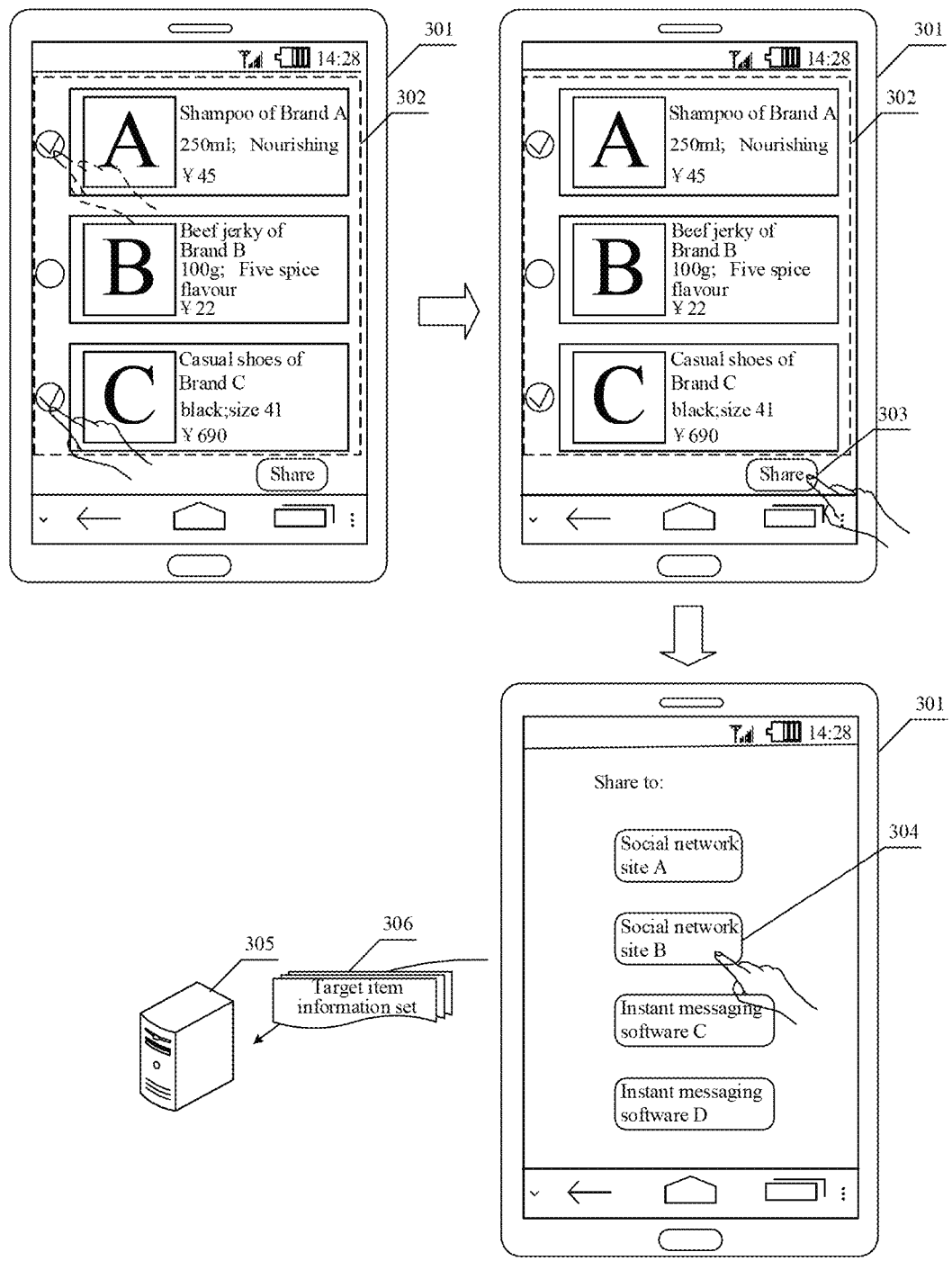
FIG. 3 is a schematic diagram of an application scenario of the method for sharing information according to an embodiment of the present disclosure.

Further referring to FIG. 3, which is a schematic diagram of an application scenario of the method for sharing information according to this embodiment. In the application scenario of FIG. 3, the user clicks the check box on the left of the item information of item A and the check box on the left of the item information of item C in the candidate item information set 302 presented by the sharing terminal device 301 to select the items. At this time, the sharing terminal device 301 detects that the user selects item information from the candidate item information set 302, and may add the item information of item A and the item information of item C to the target item information set 306. After that, the user clicks the "Share" icon 303 on the sharing terminal device 301, and then clicks the "B social network site" icon 304. The sharing terminal device 301 detects that the user shares the target item information set 306 to the social network site B. Then, the sharing terminal device 301 may send the target item information set 306 (including the item information of item A and the item information of item C) to the server 305 of the social network site B.

The method provided by the above embodiment of the present disclosure, through that the user selects the item information to be shared from the candidate item information set (item information of the items in the shopping cart corresponding to the user account of the user), realizes the batch sending of the item information and improves flexibility in information sharing.

Figure 4:
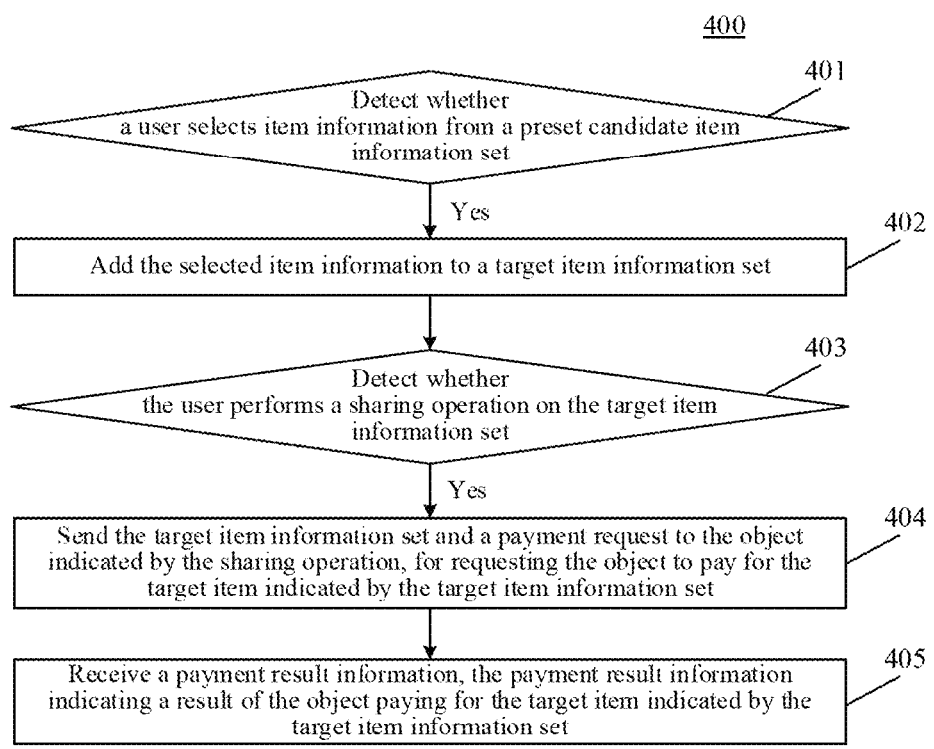
FIG. 4 is a flowchart of a method for sharing information according to another embodiment of the present disclosure.

Further referring to FIG. 4, which illustrates a flow 400 of another embodiment of the method for sharing information. The flow 400 of the method for sharing information includes the following steps:

Step 401, detecting whether a user selects item information from a preset candidate item information set.

Step 402, in response to detecting that the user selects the item information from the preset candidate item information set, adding the selected item information to a target item information set.

Step 403, detecting whether the user performs a sharing operation on the target item information set.

In this embodiment, steps 401-403 may be performed in a manner similar to steps 201-203, which will not be repeated here.

Step 404, in response to detecting that the user performs a sharing operation on the target item information set, sending, to an object indicated by the sharing operation, the target item information set and a payment request for requesting the object to pay for a target item indicated by the target item information set.

In this embodiment, if that the above user performs a sharing operation on the above target item information set is detected in step 403, the above execution body may send, to the object indicated by the sharing operation, the above target item information set and the payment request for requesting the above object to pay for the target item indicated by the above target item information set. Here, the above payment request may include a payment amount.

As an example, after receiving the above target item information set and the above payment request, the terminal device of the above object may present the above target item information set, a "Pay" icon for paying for the above target item, and the payment amount. The user may make payment for the above target item by clicking the above "Pay" icon.

Here, the terminal device of the above object may also present a "Refuse" icon for refusing to pay for the above target item while presenting the above "Pay" icon, and the user may click the above "Refuse" icon to refuse to pay for above target item.

Step 405, receiving a payment result information, the payment result information indicating a result of the object paying for the target item indicated by the target item information set.

In this embodiment, the above execution body may receive the payment result information of the payment made by the object for the target item indicated by the target item information set. Here, the payment result information may include payment success information and payment failure information. As an example, if the above object clicks the "Pay" icon to pay for the above target item, and after the payment succeeds, the above execution body may receive the payment success information. If the above object clicks the "Pay" icon to pay for the above target item, but the payment fails due to some reasons (for example, network connection interruption, insufficient balance, etc.), the above execution body may receive the payment failure information. If the above object clicks the "Refuse" icon to refuse to pay for the above target item, the above execution body may receive the payment failure information.

As can be seen from FIG. 4, compared with the embodiment corresponding to FIG. 2, the flow 400 of the method for sharing information in this embodiment embodies the steps of requesting the object indicated by the sharing operation to pay for the item indicated by the target item information set and receiving payment result information. Therefore, the solution described in this embodiment enables the user to view, when paying for others, the item information of the paid item, which increases the richness of the presented item information.

Figure 5:
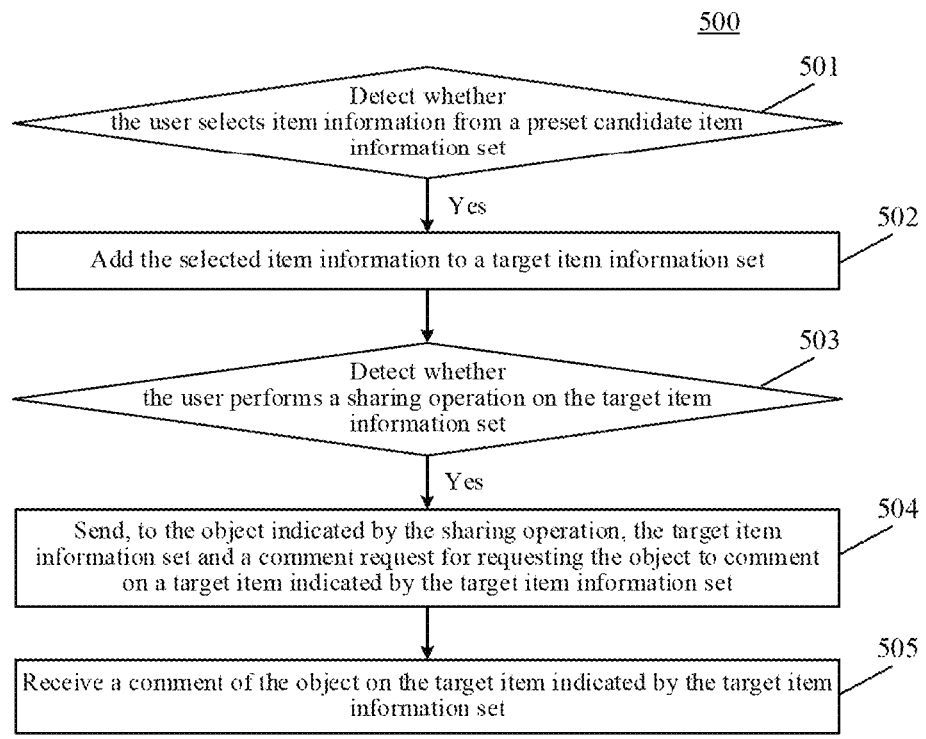
FIG. 5 is a flowchart of a method for sharing information according to yet another embodiment of the present disclosure.

Further referring to FIG. 5, which illustrates a flow 500 of yet another embodiment of the method for sharing information. The flow 500 of the method for sharing information includes the following steps:

Step 501, detecting whether a user selects item information from a preset candidate item information set.

Step 502, in response to detecting that the user selects item information from the preset candidate item information set, adding the selected item information to a target item information set.

Step 503, detecting whether the user performs a sharing operation on the target item information set.

In this embodiment, steps 501-503 may be performed in a manner similar to steps 201-203, which will not be repeated here.

Step 504, in response to detecting that the user performs a sharing operation on the target item information set, sending, to the object indicated by the sharing operation, the target item information set and a comment request for requesting the object to comment on a target item indicated by the target item information set.

In this embodiment, if that the above user performs a sharing operation on the above target item information set is detected in step 503, the above execution body may send the above target item information set and the comment request to the object indicated by the sharing operation, for requesting the above object to comment on a target item indicated by the above target item information set.

As an example, after receiving the above target item information set and the above comment request, the terminal device of the above object may present the above target item information set and a "Comment" icon for commenting on the above target item. The user may enter a comment in a presented comment box after clicking the above "Comment" icon.

It should be noted that each piece of item information in the above target item information set may correspond to a "Comment" icon, and the user may comment on the item indicated by the item information corresponding to the clicked "Comment" icon.

Step 505, receiving the comment of the object on the target item indicated by the target item information set.

In this embodiment, the above execution body may receive the comment of the above object on the target item indicated by the above target item information set. It should be noted that, if each piece of item information in the above target item information set corresponds to a "Comment" icon, the above execution body may receive a set of comment information, and each piece of comment information in the set of comment information may correspond to an item identifier.

As can be seen from FIG. 5, compared with the embodiment corresponding to FIG. 2, the flow 500 of the method for sharing information in this embodiment embodies the steps of: requesting the object indicated by the sharing operation to comment on the item indicated by the target item information set, and receiving the comment. Therefore, the solution described in this embodiment increases the real-time interactivity of the user with the items indicated by the item information in the shopping cart.

Figure 6:
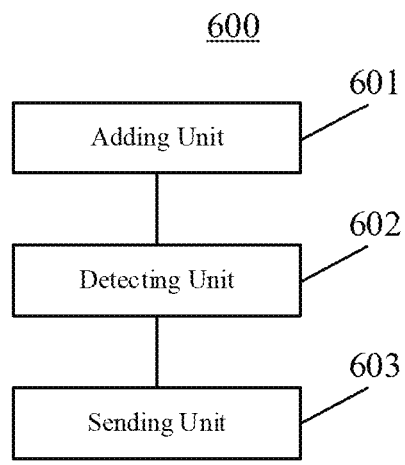
FIG. 6 is a schematic structural diagram of an apparatus for sharing information according to an embodiment of the present disclosure.

Further referring to FIG. 6, as an implementation of the method shown in the above drawings, an embodiment of the present disclosure provides an apparatus for sharing information. The embodiment of the apparatus corresponds to the embodiment of the method shown in FIG. 2. The apparatus may be applied in various electronic devices.

As shown in FIG. 6, the apparatus 600 for sharing information in this embodiment includes: an adding unit 601, a detecting unit 602 and a sending unit 603. The adding unit 601 is configured to add selected item information to the target item information set in response to detecting that the user selects item information from a preset candidate item information set. The detecting unit 602 is configured to detect whether the user performs a sharing operation on the target item information set. The sending unit 603 is configured to send the target item information set to the object indicated by the sharing operation in response to detecting that the user performs a sharing operation on the target item information set.

In this embodiment, the detailed processing of the adding unit 601 of the apparatus 600 for sharing information may refer to steps 201 and 202 in the embodiment corresponding to FIG. 2, the detailed processing of the detecting unit 602 may refer to step 203 in the embodiment corresponding to FIG. 2, and the detailed processing of the sending unit 603 may refer to step 204 in the embodiment corresponding to FIG. 2.

In some optional implementations of this embodiment, the above adding unit 601 may determine whether the above screening information input by the user is received. As an example, if the above user inputs screening information in the screening box for screening, and then clicks a "Confirm" button, that the above screening information input by the above user is received may be determined. After that, the above adding unit 601 may use the above screening information to select item information from the above candidate item information set, and add the selected item information to the target item information set. Particularly, the above adding unit 601 may firstly perform word segmentation on the above screening information to obtain a screening word; then, the above screening word may be matched with pre-classified item keywords (for example, brand words and category words) corresponding to respective item information in the above candidate item information set; then, item information whose matching degree is greater than a preset matching degree threshold may be added to the target item information set. Generally speaking, the above screening information may include, but is not limited to, at least one of the following: brand terms and/or category terms (for example, mobile phones, diapers).

In some optional implementations of this embodiment, if that the above user performs a sharing operation on the above target item information set is detected, the above sending unit 603 may send the above target item information set and a payment request to the object indicated by the sharing operation for requesting the above object to pay for the target item indicated by the above target item information set. Here, the above payment request may include a payment amount. As an example, after receiving the above target item information set and the above payment request, the terminal device of the above object may present the above target item information set, a "Pay" icon for paying for the above target item, and the payment amount. The user may make payment for the above target item by clicking the above "Pay" icon. Here, the terminal device of the above object may also present a "Refuse" icon for refusing to pay for the above target item while presenting the above "Pay" icon, and the user may click the above "Refuse" icon to refuse to pay for above target item.

In some optional implementations of this embodiment, the above apparatus 600 for sharing information may further include a first receiving unit (not shown in the drawings). The above first receiving unit may receive the payment result information of the payment made by the object for the target item indicated by the above target item information set. Here, the payment result information may include payment success information and payment failure information. As an example, if the above object clicks the "Pay" icon to pay for the above target item, and after the payment succeeds, the above first receiving unit may receive the payment success information. If the above object clicks the "Pay" icon to pay for the above target item, but the payment fails due to some reasons (for example, network connection interruption, insufficient balance, etc.), the above first receiving unit may receive the payment failure information. If the above object clicks the "Refuse" icon to refuse to pay for the above target item, the above first receiving unit may receive the payment failure information.

In some optional implementations of this embodiment, if that the above user performs a sharing operation on the above target item information set is detected, the above sending unit 603 may send, to the object indicated by the sharing operation, the above target item information set and a comment request for requesting the above object to comment on the target item indicated by the above target item information set. As an example, after receiving the above target item information set and the above comment request, the terminal device of the above object may present the above target item information set and a "Comment" icon for commenting on the above target item. The user may enter comment information in a presented comment box after clicking the above "Comment" icon. It should be noted that each piece of item information in the above target item information set may correspond to a "Comment" icon, and the user may comment on the item indicated by the item information corresponding to the clicked "Comment" icon.

In some optional implementations of this embodiment, the above apparatus 600 for sharing information may further include a second receiving unit (not shown in the drawings). The above second receiving unit may receive the comment of the user on the target item indicated by the above target item information set. It should be noted that, if each piece of item information in the above target item information set corresponds to a "Comment" icon, the above second receiving unit may receive a set of comment information, and each piece of comment information in the set of comment information may correspond to an item identifier.

In some optional implementations of this embodiment, the above apparatus 600 for sharing information may further include a user profile acquiring unit (not shown in the drawings), an input unit (not shown in the drawings) and a first presenting unit (not shown in the drawings). The above user profile acquiring unit may acquire the user profile of the above user. The above user is usually the user to which the user account logged in the above execution body belongs. The user's user profile may be a tag user profile abstracted from information such as user demographic information, social relationships, preference habits and consumption behavior, and the user profile may include at least one user tag. Here, the user's user profile may include static user profile. The static user profile usually includes the user's basic information, such as age, gender, city of residence, high consumption level, having children, loving sports, and so on. The user's user profile may also include dynamic user profile. The dynamic user profile is usually information related to the user's operation behavior, for example, the user's search behavior, shopping cart behavior, the object targeted by the user's click behavior and browsing behavior, etc., duration of the user's click behavior and browsing behavior, etc., where the user clicks on the page, and the like. Afterwards, the above input unit may input the above user profile into a pre-trained recommendation model to obtain an item information set. The obtained item information set may include item information of items of different categories. A category may refer to the last-level commodity classification involved in a customer's purchase decision, which can be associated with a brand, and a corresponding purchase selection can be completed on this classification. For example, mineral water, air conditioners, paper towels, etc., are all categories. Here, the above obtained item information set is usually a set composed of respective item information in the user's shopping list. It should be noted that the number of resulting item information sets may be greater than or equal to 2. Here, the above recommendation model may be used to represent the corresponding relationships between user's user profiles and item information sets. The above input unit may acquire the above recommendation model from an electronic device that stores trained recommendation models. Here, the electronic device that stores the trained recommendation model may train the recommendation model representing corresponding relationships between user's user profiles and item information sets in various ways. Then, the above first presenting unit may present the obtained item information set. The user may shop with reference to the presented item information set.

In some optional implementations of this embodiment, the above apparatus 600 for sharing information may further include a second presenting unit (not shown in the drawings) and a reply sending unit (not shown in the drawings). In some optional implementations of this embodiment, the above second presenting unit may determine whether a questioner's question targeting at the above target item information set is received. After the above user shares the above target item information set on the social platform or to the contact in an instant messaging software, if another user (a user who views the above target item information set on the above social platform or the above instant messaging software) has a question with the above target item information set and need to consult the above user, this another user may ask a question about the above target item information set; then, the question may be sent to the terminal where the user account of the above user is located. If the questioner's question on the above target item information set is received, the second presenting unit may present the above question. If the above user views the above question on the above execution body, he may reply to the above question. The above reply sending unit may determine whether a reply of the above user to the above question is received. As an example, if the above user clicks a reply button for replying to the above question, then inputs the reply in the reply box and clicks the "Confirm" button or the "Send" button, it can be determined that the above user's reply to the above question has been received. If the reply from the above user to the above question is received, the above reply information sending unit may send the above reply to the terminal of the above questioner.

In some optional implementations of this embodiment, the above apparatus 600 for sharing information may further include an operation information acquiring unit (not shown in the drawings), a determination unit (not shown in the drawings) and a preferential information adding unit (not shown in the drawings). The above operation information acquiring unit may acquire operation information of operations performed by other users on the above target item information set. The operations performed by other users on the above target item information set may include, but are not limited to, at least one of the following: operation of clicking, operation of browsing, operation of adding item information to the shopping cart, operation of favoriting item information, and operation of purchasing. The operation information may include the operation time of the operation performed by the user. The above determination unit may determine the adoption rate of that the above target item information set is adopted by other users based on the above operation information. Here, the above determination unit may store the corresponding relationship between the operation identifier and the weight corresponding to the operation. The above determination unit may search for weights corresponding to the operation identifiers of the operations performed by other users on the above target item information set, and determine the sum of the weights as the adoption rate of that the target item information set is adopted by other users. It should be noted that the sum of the weights corresponding to the operation identifiers of each operation is usually 1. As an example, other users performed an operation of clicking, an operation of favoriting, and an operation of purchasing on the above target item information set. The weight corresponding to the operation of clicking is 0.1, the weight corresponding to the operation of favoriting is 0.2, and the weight corresponding to the operation of purchasing is 0.3. Thus, the sum thereof 0.6 is determined as the adoption rate of that the above target item information set is adopted by other users. Then, the above preferential information adding unit may determine whether the adoption rate is greater than a preset adoption rate threshold, and if it is determined that the above adoption rate is greater than the preset adoption rate threshold, the above preferential information adding unit may add preset preferential information to the user account of the above user. The above preferential information may be an information of discount for purchase up to a preset value, for example, an information of 5 yuan reduction for purchase up to 38 yuan; the preferential information may also be a discount information, for example, an information of 20% off for clothing items; the preferential information may also be a gift information, for example, an information of giving a specified item for purchase up to 88 yuan. It should be noted that, the above execution body may store the corresponding relationships between adoption rates and preferential information. The above user may view the available preferential information in his/her user account.

In some optional implementations of this embodiment, the above candidate item information set may include item information of purchased items and item information of unpurchased items. That is, the above user's shopping cart list may include both item information of items that the user has ordered, and item information of items that the user has not ordered. At this time, the item information of the purchased item and the item information of the unpurchased item may be marked with different identifiers, so as to distinguish the item information of the purchased items from the item information of the unpurchased items. As an example, a purchased identifier, such as a "purchased" character or a "√" icon, may be added around (for example, to the left side) of the item information of the purchased items, at this time, an unpurchased identifier, such as an "unpurchased" character or a "x" icon, may be added to the left side of the item information of the unpurchased items. As another example, if the item information includes an image depicting the item, a grayscale image of the image depicting the purchased item may be determined, and the grayscale image is used instead of the original image depicting the item for presentation. Then, the image depicting the purchased item is a grayscale image, while the image depicting the unpurchased item is a color image.

Figure 7:
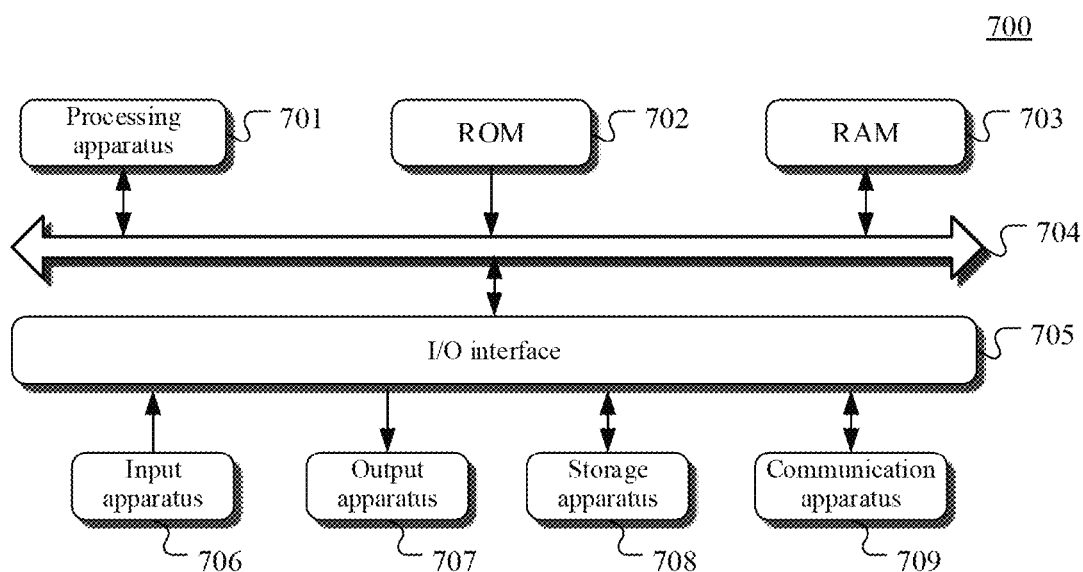
FIG. 7 is a schematic structural diagram of a computer system of an electronic device adapted to implement embodiments of the present disclosure.

Referring to FIG. 7, which illustrates a schematic structural diagram of a electronic device 700 of an electronic device (e.g., the terminal devices 101, 102 and 103 shown in FIG. 1) adapted to implement embodiments of the present disclosure. Terminal devices in embodiments of the present disclosure may include, but are not limited to, such as mobile phones, notebook computers, digital broadcast receivers, PDA (Personal Digital Assistant), PAD (Tablet Computers), PMP (Portable Multimedia Player), vehicle-mounted terminals (For example, mobile terminals such as car navigation terminals) and the like, and stationary terminals such as digital TVs, desktop computers, and the like. The electronic device shown in FIG. 7 is merely an example, and should not bring any limitation to the functions and the scope of use of embodiments of the present disclosure.

As shown in FIG. 7, the electronic device 700 may include processing apparatus (for example, central processing unit, graphics processor, etc.) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

The following components are usually connected to the I/O interface 705: an input apparatus 706 including, for example, a touch screen, a touchpad, a keyboard, a mouse, a camera, a microphone, an accelerometer, a gyroscope, etc.; an output apparatus 707 comprising, for example, a liquid crystal display device (LCD), a speaker, a vibrator, etc.; and a communication apparatus 709. The communication apparatus 709 may allow the electronic device 700 to communicate wirelessly or by wire with other devices to exchange data. Although FIG. 7 illustrates an electronic device 700 having various apparatus, it should be appreciated that not all of the illustrated apparatus are required to be implemented or provided. More or fewer apparatus may be alternatively implemented or provided. Each block shown in FIG. 7 may represent one apparatus, and may also represent multiple apparatus as required.

In particular, according to the embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication apparatus 709, or may be installed from the storage apparatus 708, or may be installed from the ROM 702. The computer program, when executed by the processing apparatus 701, implements the above mentioned functionalities as defined by the methods of the embodiments of the present disclosure. It should be noted that the computer readable medium in the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the embodiments of the present disclosure, the computer readable storage medium may be any physical medium containing or storing programs which can be used by a command execution system, apparatus or element or incorporated thereto. In the embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wire, optical cable, RF (Radio Frequency) medium etc., or any suitable combination of the above.

The above computer-readable medium may be included in the above electronic device; or may exist alone without being assembled into the electronic device. The above computer-readable medium carries one or more programs, and when the above one or more programs are executed by the electronic device, the electronic device: in response to detecting that the user selects item information from the preset candidate item information set, adding a selected item information to a target item information set; detecting whether the user performs a sharing operation on the target item information set; in response to detecting that the user performs a sharing operation on the target item information set, sending the target item information set to the object indicated by the sharing operation.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The described units involved in the embodiments of the present disclosure may be implemented by means of software or hardware. The described units may also be provided in a processor. For example, the processor may be described as: a processor including an adding unit, a detecting unit and a sending unit. Here, the names of these units do not in some cases constitute a limitation to such units themselves. For example, the receiving unit may alternatively be described as "a unit that detects whether the user performs a sharing operation on the target item information set".

The above description only provides an explanation of the preferred embodiments of the present disclosure and the technical principles used. It should be appreciated by those skilled in the art that the inventive scope of the embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the embodiments of the present disclosure are examples.

What is claimed is:

1. A method for sharing information, comprising:
    displaying, on an interface of a terminal device, item information in a preset candidate item information set, a selection button corresponding to each piece of item information, and a share button, wherein each piece of item information comprises an image depicting a corresponding item, and wherein an image depicting a purchased item is a presented as a grayscale image, and an image depicting an unpurchased item is presented as a color image;
    in response to detecting a multi-clicking operation on selection buttons corresponding to respective pieces of item information for selecting item information from the preset candidate item information set, adding the selected pieces of item information to a target item information set, comprising:
    in response to receiving screening information input by a user, using the screening information to select the pieces of item information from the preset candidate item information set, and adding the selected pieces of item information to the target item information set, wherein the preset candidate item information set is a set composed of item information of items in a shopping cart corresponding to a user account of the user, and the target item information set is a shopping cart list to be shared and is obtained after filtering item information in the shopping cart;
    displaying an icon representing an object to share with on the interface in response to detecting a clicking operation on the share button, wherein the share button is associated with a share operation for sharing the target item information set; and
    sending, in response to detecting a clicking operation on the icon representing an object to share with, the target item information set to the object via a communication link, wherein the object comprises a social network site or an instant messaging software application installed on another terminal device.

2. The method according to claim 1, wherein the sending the target item information set to the objectcomprises:
    sending, to the object, the target item information set and a payment request for requesting the object to pay for a target item indicated by the target item information set.

3. The method according to claim 2, wherein the method further comprises:
    receiving a payment result information, the payment result information indicating a result of the object paying for the target item indicated by the target item information set.

4. The method according to claim 1, wherein the sending the target item information set to the object comprises:
    sending, to the object, the target item information set and a comment request for requesting the object to comment on a target item indicated by the target item information set.

5. The method according to claim 4, wherein the method further comprises:
    receiving a comment of the object on the target item indicated by the target item information set.

6. The method according to claim 1, wherein the method further comprises:
    acquiring a user profile of the user;
    inputting the user profile into a pre-trained recommendation model to obtain an item information set, wherein, the obtained item information set includes item information of items of different categories; and
    presenting the obtained item information set.

7. The method according to claim 1, wherein the method further comprises:
    in response to receiving a question targeting at the target item information set from a questioner, presenting the question; and in response to receiving a reply of the user on the question, sending the reply to a terminal of the questioner.

8. The method according to claim 1, wherein the method further comprises:
acquiring operation information of operations performed by other users on the target item information set;
determining, based on the acquired operation information, an adoption rate of the target item information set by the other users; and
in response to determining that the adoption rate is greater than a preset adoption rate threshold, adding a preset preferential information to a user account of the user.

9. The method according to claim 1, wherein the candidate item information set includes item information of a purchased item and item information of an unpurchased item.

10. An electronic device, comprising:
one or more processors; and a storage apparatus, configured to store one or more programs, wherein the one or more programs, when executed by the one or more processors, cause the one or more processors to implement operations, the operations comprising:
displaying, on an interface of a terminal device, item information in a preset candidate item information set, a selection button corresponding to each piece of item information, and a share button, wherein each piece of item information comprises an image depicting a corresponding item, and wherein an image depicting a purchased item is a presented as a grayscale image, and an image depicting an unpurchased item is presented as a color image;
in response to detecting a multi-clicking operation on the selection button corresponding to respective pieces of item information for selecting item information from the preset candidate item information set, adding the selected pieces of item information to a target item information set, comprising: in response to receiving screening information input by a user, using the screening information to select the pieces of item information from the preset candidate item information set, and adding the selected pieces of item information to the target item information set,
wherein the preset candidate item information set is a set composed of item information of items in a shopping cart corresponding to a user account of the user, and the target item information set is a shopping cart list to be shared and is obtained after filtering item information in the shopping cart;
displaying an icon representing an object to share with on the interface in response to detecting a clicking operation on the share button, wherein the share button is associated with a share operation for sharing the target item information set; and
sending, in response to detecting a clicking operation on the icon representing an object to share with, the target item information set to the object via a communication link indicated by the sharing operation, wherein the object indicated by the sharing operation comprises a social network site or an instant messaging software application installed on another terminal device.

11. A non-transitory computer readable medium, storing a computer program, wherein the program, when executed by a processor, cause the processor to implement operations, the operations comprising:
displaying, on an interface of a terminal device, item information in a preset candidate item information set, a selection button corresponding to each piece of item information, and a share button, wherein each piece of item information comprises an image depicting a corresponding item, and wherein an image depicting a purchased item is a presented as a grayscale image, and an image depicting an unpurchased item is presented as a color image;
in response to detecting a multi-clicking operation on the selection button for selecting item information from the preset candidate item information set, adding the selected pieces of item information to a target item information set, comprising:
in response to receiving screening information input by a user, using the screening information to select the pieces of item information from the preset candidate item information set, and adding the selected pieces of item information to the target item information set, wherein the preset candidate item information set is a set composed of item information of items in a shopping cart corresponding to a user account of the user, and the target item information set is a shopping cart list to be shared and is obtained after filtering item information in the shopping cart;
displaying an icon representing an object to share with on the interface in response to detecting a clicking operation on the share button, wherein the share button is associated with a share operation for sharing the target item information set; and
sending, in response to detecting a clicking operation on the icon representing an object to share with, the target item information set to the object via a communication link, wherein the object indicated by the sharing operation comprises a social network site or an instant messaging software application installed on another terminal device.

12. The electronic device according to claim 10, wherein the sending the target item information set to the object indicated by the sharing operation comprises:
sending, to the object indicated by the sharing operation, the target item information set and a payment request for requesting the object to pay for a target item indicated by the target item information set.

13. The electronic device according to claim 12, wherein the operations further comprise:
receiving a payment result information, the payment result information indicating a result of the object paying for the target item indicated by the target item information set.

14. The electronic device according to claim 10, wherein the sending the target item information set to the object comprises:
sending, to the object, the target item information set and a comment request for requesting the object to comment on a target item indicated by the target item information set.

15. The electronic device according to claim 14, wherein the operations further comprise:
receiving a comment of the object on the target item indicated by the target item information set.

16. The electronic device according to claim 10, wherein the operations further comprise:
acquiring a user profile of the user;
inputting the user profile into a pre-trained recommendation model to obtain an item information set, wherein, the obtained item information set includes item information of items of different categories; and
presenting the obtained item information set.

17. The electronic device according to claim 10, wherein the operations further comprise:
- in response to receiving a question targeting at the target item information set from a questioner, presenting the question; and
- in response to receiving a reply of the user on the question, sending the reply to a terminal of the questioner.

18. The electronic device according to claim 10, wherein the operations further comprise:
- acquiring operation information of operations performed by other users on the target item information set;
- determining, based on the acquired operation information, an adoption rate of the target item information set by the other users; and
- in response to determining that the adoption rate is greater than a preset adoption rate threshold, adding a preset preferential information to a user account of the user.

* * * * *